Patented Aug. 24, 1926.

1,597,653

UNITED STATES PATENT OFFICE.

WILLIAM T. LITTLE, OF ELIZABETH, NEW JERSEY, ASSIGNOR TO METAL & THERMIT CORPORATION, OF CARTERET, NEW JERSEY, A CORPORATION OF NEW JERSEY.

PROCESS OF PRODUCING STANNOUS CHLORIDE.

No Drawing.     Application filed January 12, 1925. Serial No. 1,928.

This invention relates to the manufacture of stannous chloride; and it comprises a method of electrolytically producing stannous chloride from stannic chloride in a divided or diaphragm cell wherein a solution of warm stannic chloride is continuously introduced into the anode compartment of a divided or diaphragm cell having a narrow cathode chamber, the introduction of stannic chloride into the anode compartment being at a rate about equal to the rate at which stannic chloride diffuses through the diaphragm into the cathode chamber and catholyte being removed continuously from the cathode chamber; the various rates of flow being so controlled as to insure in the outflowing liquid a slight minimal percentage of $SnCl_4$, the reduction of this residual $SnCl_4$ being afterwards if desired effected in the usual ways and the liquor concentrated to form a concentrated solution or "tin crystals" as may be desired; all as more fully hereinafter set forth and as claimed.

Stannous chloride, either as a solution or as "tin crystals" finds many uses in the art and is made on a rather large scale by processes which are unnecessarily expensive and tedious. It is the object of the present invention to provide a method wherein cost is economized and manufacture is accelerated.

Stannic chloride, $SnCl_4$, is a water-white, fuming liquid material made in various ways and available commercially. In one such way it is produced in removing the tin from tin scrap with chlorin. Stannic chloride is often one of the raw materials for making stannous chloride. In one ordinary way of producing stannous chloride, an aqueous solution of stannic chloride is slowly evaporated in a steam heated, tin lined copper kettle in the presence of metallic tin somewhat in excess of that required to reduce the stannic salt to the stannous condition. Stannous chloride formed partly at the expense of the stannic chloride and partly at the expense of the tin, $SnCl_4$ and Sn becoming $2SnCl_2$. Half the stannous chloride comes from the metallic tin used. It is obvious that this method involves the use of a large amount of metallic tin which is, relatively, an expensive material. In another commercial way, metallic tin is directly dissolved in commercial hydrochloric acid (muriatic acid) in a tarred sandstone trough with slight heating to produce a stannous chloride liquid of about 50° Baumé. In either case the solution is evaporated down in the usual ways to about 70° to 75° Baumé when it is cooled, allowing a crystallization of $SnCl_2.2H_2O$; the ordinary tin crystals of commerce. This method derives all the stannous chloride from metallic tin.

It is the object of the present invention to provide a method of producing stannous chloride from stannic chloride wherein the use of metallic tin is not required, or but a small quantity is used. To this end a warm stannic chloride solution is supplied to a divided or diaphragm cell of much the type of those customarily used in the production of chlorin and caustic soda; the stannic chloride being supplied more or less continuously to the anode chamber and a catholyte withdrawn from the cathode chamber, which is a nearly entirely reduced solution. All the contained stannous chloride is produced by reduction of stannic chloride.

It is desirable to use one of the types of cell in which the cathode chamber is really a series of narrow vertical channels made by the close approximation of a cathode and diaphragm, one or the other being corrugated. As long as any $SnCl_4$ remains in the cathode solution metallic tin does not deposit and reduction is confined to the production of stannous chloride. A little unreduced stannic chloride is therefore ordinarily left in the catholyte as a sort of factor of safety. The chlorin evolved at the anode is removed and disposed of in the ways customary in the chloride-caustic soda art. It may be used for detinning; that is, to furnish a further supply of stannic chloride. By adjusting the current density and the rate of flow of the electrolyte through the porous diaphragm and the temperature of the electrolyte the percentage of the total tin reduced to the stannous chloride and of stannic chloride left unreduced can be regulated. Ordinarily these factors are so controlled as to produce an outflowing solution showing about 80 per cent total reduction. Reduction may however be less or more complete as circumstances may render convenient. The outflowing liquor can be directly evaporated to 70 to 74° Baumé and crystallized to deposit tin crystals; the mother liquor, which contains the residual stannic chloride being returned for recirculation and re-reduction. Or the residual stannic chloride may be directly reduced by the use of tin, as in the older way of operating.

It is found that the electrolysis with the production of stannous chloride goes on smoothly at temperatures of 70° C. and higher. A very good temperature is around 83° to 85° C. This temperature may be kept up by the heat developed in the bath itself. Ordinarily the voltage drop in the cell is kept at about 6 volts with an average current density of about 0.95 amperes per square inch of cathode surface. No acid additions are necessary; cathode reduction may be simply of the stannic chloride diffusing through the diaphragm. As the diaphragm ordinary asbestos, or a composition based on asbestos, is employed. As stated most of the usual types of cell employed for making caustic soda may here be used with merely such variations in structural materials as are necessitated by the different chemistry of the things treated and produced. Stone or stoneware cells may be used. The cathode and anode may be of any material inert under the circumstances, such as graphite or magnetite.

What I claim is:—

1. The process of producing stannous chloride which comprises reducing stannic chloride solution in the cathode compartment of a divided cell under conditions precluding deposition of tin.

2. The process of producing stannous chloride which comprises reducing stannic chloride solution of a temperature of 70°–85° C. in the cathode compartment of a divided cell under conditions precluding deposition of tin.

3. The process of producing stannous chloride which comprises reducing stannic chloride soultion in a diaphragm cell and under conditions precluding deposition of tin with a continuous removal of the stannous solution as formed.

4. The process of producing stannous chloride which comprises reducing a stannic chloride solution in a diaphragm cell at 70°–85° C., leaving a certain portion of the stannic solution unreduced to prevent deposition of tin at the above temperatures and removing the product continuously from the cell.

In testimony whereof I affix my signature.

WILLIAM T. LITTLE.